United States Patent
Hawkins

(10) Patent No.: US 11,186,232 B2
(45) Date of Patent: Nov. 30, 2021

(54) ECM PROTECTION BRACKET

(71) Applicant: Christopher Hawkins, Pflugerville, TX (US)

(72) Inventor: Christopher Hawkins, Pflugerville, TX (US)

(*) Notice: Subject to any disclaimer, the term of this patent is extended or adjusted under 35 U.S.C. 154(b) by 219 days.

(21) Appl. No.: 16/029,394

(22) Filed: Jul. 6, 2018

(65) Prior Publication Data

US 2019/0009733 A1 Jan. 10, 2019

Related U.S. Application Data

(60) Provisional application No. 62/530,475, filed on Jul. 10, 2017.

(51) Int. Cl.
*B60R 11/00* (2006.01)
*B60R 11/02* (2006.01)
*E05B 67/38* (2006.01)

(52) U.S. Cl.
CPC .......... *B60R 11/00* (2013.01); *B60R 11/0264* (2013.01); *B60R 2011/0038* (2013.01); *B60R 2011/0052* (2013.01); *B60R 2011/0096* (2013.01); *E05B 67/383* (2013.01)

(58) Field of Classification Search
CPC .................. B60R 11/00; B60R 11/0264; B60R 2011/0038; B60R 2011/0052; B60R 2011/0096
USPC ............ 123/195 A, 195 AC, 195 H, 195 HC
See application file for complete search history.

(56) References Cited

U.S. PATENT DOCUMENTS

| | | |
|---|---|---|
| 3,789,945 A | 2/1974 | Hansen |
| 3,894,705 A | 7/1975 | Glassmeyer |
| 4,327,353 A | 4/1982 | Beard et al. |
| 4,834,207 A | 5/1989 | Havenhill et al. |
| 4,852,680 A | 8/1989 | Brown et al. |
| 4,913,254 A | 4/1990 | Castro et al. |
| 6,022,048 A | 2/2000 | Harshbarger et al. |
| 6,047,942 A | 4/2000 | Kennedy |
| 6,077,133 A | 6/2000 | Kojima et al. |
| 6,494,602 B2 | 12/2002 | Pastrick et al. |
| 7,186,154 B2 | 3/2007 | Takashima et al. |
| 7,398,849 B2 | 7/2008 | Koshida |
| 2003/0080271 A1 | 5/2003 | Haves |
| 2008/0223329 A1* | 9/2008 | Preimesberger ........ F02B 67/10 123/195 A |

\* cited by examiner

*Primary Examiner* — Lindsay M Low
*Assistant Examiner* — Omar Morales
(74) *Attorney, Agent, or Firm* — Sean Christian Connolly

(57) ABSTRACT

Disclosed herein is an apparatus, which physically secures an Electronic Control Module (ECM) to the chassis frame of the engine block of a diesel vehicle's engine, such as the 12.7 Liter or the 14 Liter Series 60 Detroit Diesel Engines, using a heavy, lockable bracket that prevents the removal of the ECM from the diesel engine it controls. The most preferred embodiments comprise a diagonal cross beam with mounting cylinders on each end and studded mounting bolts, which allow the device to be secured to an engine block and to surround and secure the ECM against theft. Another embodiment comprises two inwardly-facing parallel L-beams, which comprise mounting cylinders, joined by a flat cross beam and studded mounting bolts, which allow the device to be secured to an engine block and to surround and secure the ECM against theft.

4 Claims, 23 Drawing Sheets

ECM PROTECTION BRACKET

CROSS-REFERENCE TO RELATED APPLICATIONS

This application claims benefit of U.S. Provisional Patent Application No. 62/530,475, which was filed on Jul. 10, 2017, and which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of security systems. More particularly, the preferred embodiments of the present invention relate generally to anti-theft security systems. More particularly, the preferred embodiments of the present invention relate generally to anti-theft security systems for automobiles. More particularly, the preferred embodiments of the present invention relate generally to anti-theft security systems for components of diesel engines. More particularly, the preferred embodiments of the present invention relate generally to anti-theft security systems for electronic components of diesel engines. More particularly, the preferred embodiments of the present invention relate generally to anti-theft security systems for electronic components of diesel engines, which use brackets to secure Electronic Control Modules (ECMs) to the engine blocks of diesel engines.

2. Description of the Related Art

The broad concept of security systems is known. However, most of these devices are not well suited for individual electrical components.

Anti-theft systems for vehicles are also known. However, these inventions usually provide security against theft of the entire vehicle.

The broad concept of brackets is also known. However, these devices are generally applicable for holding a component in place or provide other support structure and do not necessarily secure a component against theft.

It is also known to use brackets for electrical components. However, these devices are normally used for holding an electrical component in place in order to provide stable connection points for the electrical component and do not necessarily secure an electrical component against theft.

Brackets for electrical components of diesel engines are also known. However, these devices are normally used for holding an electrical component in place adjacent to the diesel engine in order to provide stable connection points between the electrical component the diesel engine or protect the component from vibration or other stress and do not necessarily secure an electrical component against theft.

SUMMARY OF THE INVENTION

Most modern diesel engines use an Electronic Control Module (ECM) to optimize the performance of the engine. An ECM is basically an on-board computer, which controls various aspects of the diesel engine, and, without an ECM, such engines may fail to operate properly. ECMs are not only critical to the functioning of these types of diesel engines, but they are also valuable technology that can be interchanged with other diesel engines. Often, these ECMs are mounted to the underside of a tractor-trailer truck in a location that can be easily accessed, especially with the 12.7 Liter and 14 Liter Series 60 Detroit Diesel Engines. Because of the ease of access to these valuable, critical and interchangeable ECMs, the modules are often targets of theft. The theft of an ECM can leave a tractor-trailer truck incapacitated and requires expensive replacement parts and time-consuming labor to repair. The ECM Protection Bracket invention was developed in part to overcome the problems created by easily accessible, and easily stolen, ECMs in 12.7 Liter and 14 Liter Series 60 Detroit Diesel Engines. In broad embodiment, the ECM Protection Bracket invention provides an apparatus, which physically secures an ECM to the chassis frame of a diesel vehicle using a heavy, lockable bracket that prevents the removal of the ECM from the diesel engine it controls.

In the more preferred embodiments, the present invention relates to an apparatus for securing an ECM in 12.7 Liter or 14 Liter Series 60 Detroit Diesel Engines against theft, which comprises two inwardly-facing parallel L-beams, a first L-beam and a second L-beam, joined by a flat cross beam welded to middle of the two parallel L-beams; and three studded mounting bolts, which comprise an extended stud portion and which are securable using mount bolts, which attach to the extended stud portions. The first L-beam comprises a first top; a first side; and an off-center cylinder, which extends from interior of the "L" of the first L-beam on the other side of where the flat cross beam attaches to the first L-beam. The second L-beam comprises a second top; a second side; and two outer cylinders, a first outer cylinder and a second outer cylinder, which both extend through the second top of the second L-beam at the ends of the second L-beam. The second L-beam further comprises a cutout in the middle of the second L-beam for accommodating the topography of chassis frame for the L-beam engine block to which the ECM Protection Bracket attaches. The first outer cylinder comprises a lock hole, which may receive a padlock; a first outer opening; and a mounting ring, which comprises a narrow stud opening, fixed in the middle of the first outer cylinder. The second outer cylinder comprises a second outer opening and a mounting ring, which comprises a narrow stud opening, fixed in the middle of the second outer cylinder. The flat crossbeam comprises a larger cylinder, which extends from the flat cross beam on the other side of the first L-beam from where the off-center cylinder is mounted and further comprises a smaller diameter hole concentric within the larger cylinder. The flat cross beam comprises a length that substantially spans the width of a ECM, such that the off-center cylinder and larger cylinder align with a mounting bolt hole in the engine block adjacent to the middle of the ECM. The first L-beam comprises a length that substantially spans the length of an ECM. The second L-beam comprises a length that extends beyond the length of an ECM, such that the first outer cylinder and the second outer cylinder line up with mounting bolt holes in the engine block on either side of the ECM.

In the most preferred embodiments, the present invention relates to an apparatus for securing an ECM in 12.7 Liter or 14 Liter Series 60 Detroit Diesel Engines against theft, which comprises a diagonal cross beam; a first mounting cylinder and a second mounting cylinder, which are mounted at opposite ends of the diagonal cross beam; and two studded mounting bolts, which comprise an extended stud portion and which are each enclosable within the first mounting cylinder or the second mounting cylinder and securable using nuts, which attach to the extended stud portions. The first mounting cylinder comprises a short hollow cylinder with a first opening at the top of the short hollow cylinder and a mounting ring, which comprises a narrow stud opening, permanently attached to the bottom of the short hollow cylinder. The first mounting cylinder is permanently attached to the first end of the diagonal cross beam at its first connection point, which is located substantially near the top of the short hollow cylinder. The second mounting cylinder comprises a tall hollow cylinder with a second opening at the top of the tall hollow cylinder and a mounting ring, which comprises a narrow stud opening, permanently attached to the bottom of the tall hollow cylinder. The tall hollow cylinder further comprises a lock opening near the top of the tall hollow cylinder. The second mounting cylinder is permanently attached to the second end of the diagonal cross beam at its second connection point, which is located below the lock opening. The diagonal cross beam comprises a length that substantially spans the diagonal length of an ECM, such that the first mounting cylinder and a second mounting cylinder align, respectively, with diagonally opposite mounting bolt holes in the engine block, which are normally used to mount an ECM by itself. Further, the first mounting cylinder and the second mounting cylinder comprise depths sufficient to span the depth of an ECM. In sum, the ECM Protection Bracket invention provides a convenient and cost effective means of securing an ECM in 12.7 Liter or 14 Liter Series 60 Detroit Diesel Engines against theft.

Other details, not specifically set forth, will become apparent from the following detailed description.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the most preferred embodiments of apparatuses, which physically secures an ECM to the chassis frame of a diesel vehicle using a heavy, lockable bracket that prevents the removal of the ECM from the diesel engine it controls. These embodiments are not intended to limit the scope of the present invention.

Figure 1:
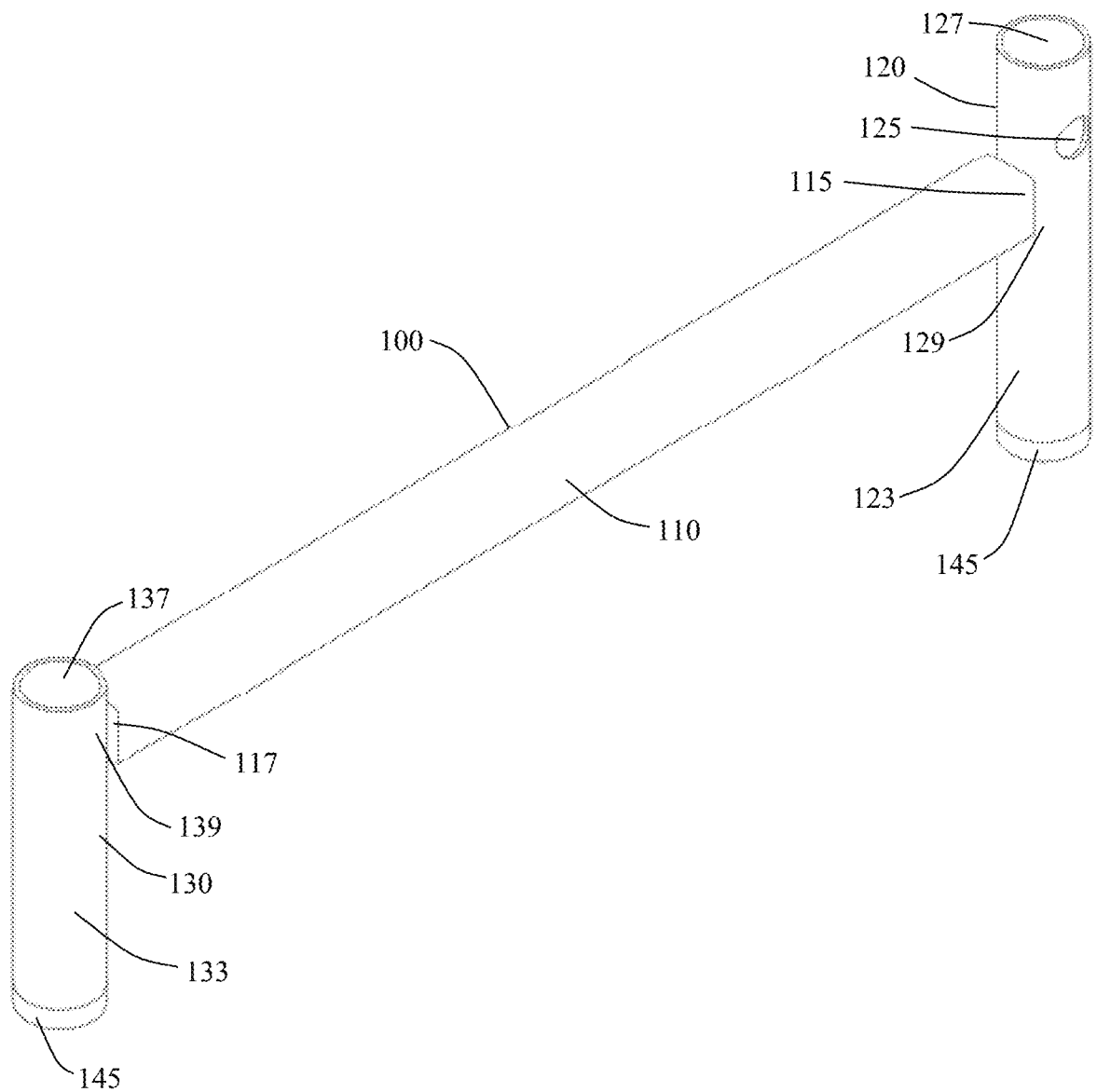
FIG. 1 is a front perspective view of the most preferred embodiment of an apparatus of the present invention.
Figure 2:
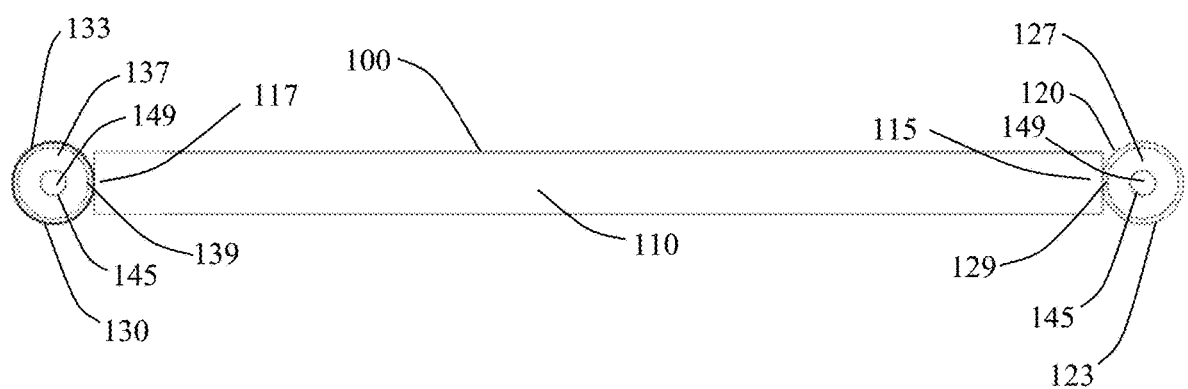
FIG. 2 is a top view of an apparatus of FIG. 1.
Figure 3:
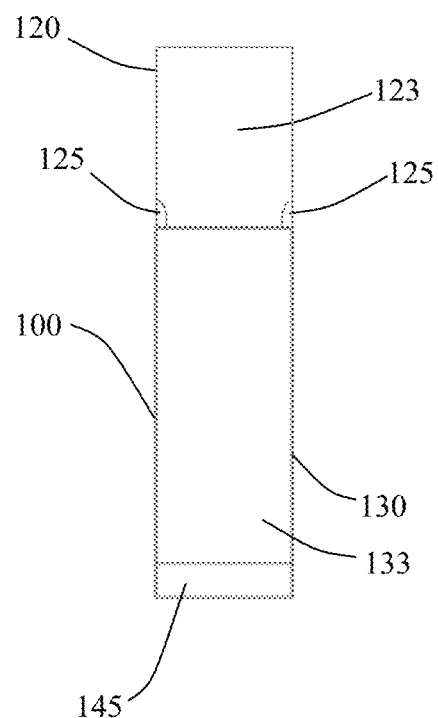
FIG. 3 is a left side view of an apparatus of FIG. 1.
Figure 4:
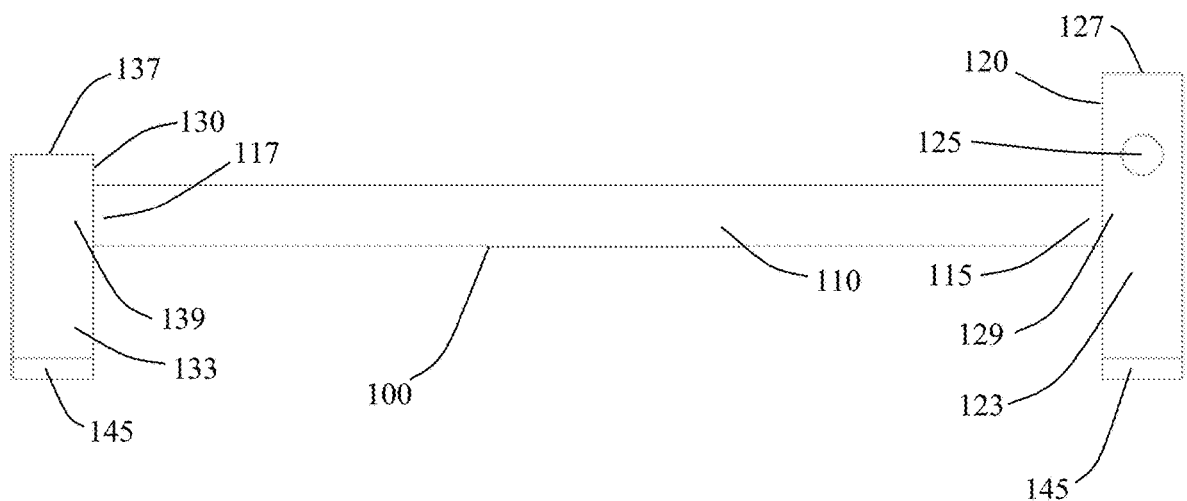
FIG. 4 is a front view of an apparatus of FIG. 1.
Figure 5:
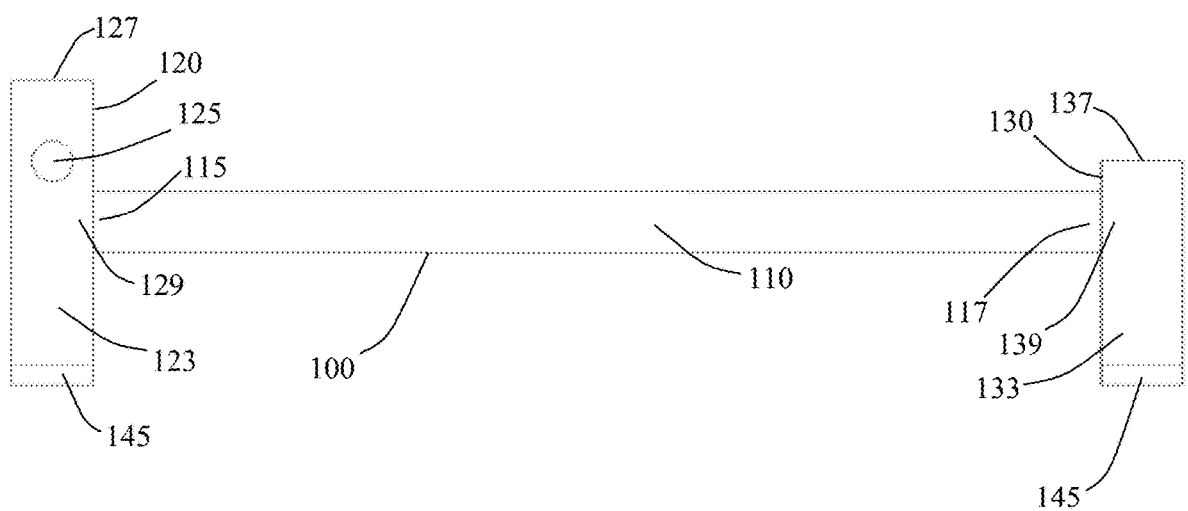
FIG. 5 is a rear view of an apparatus of FIG. 1.
Figure 6:
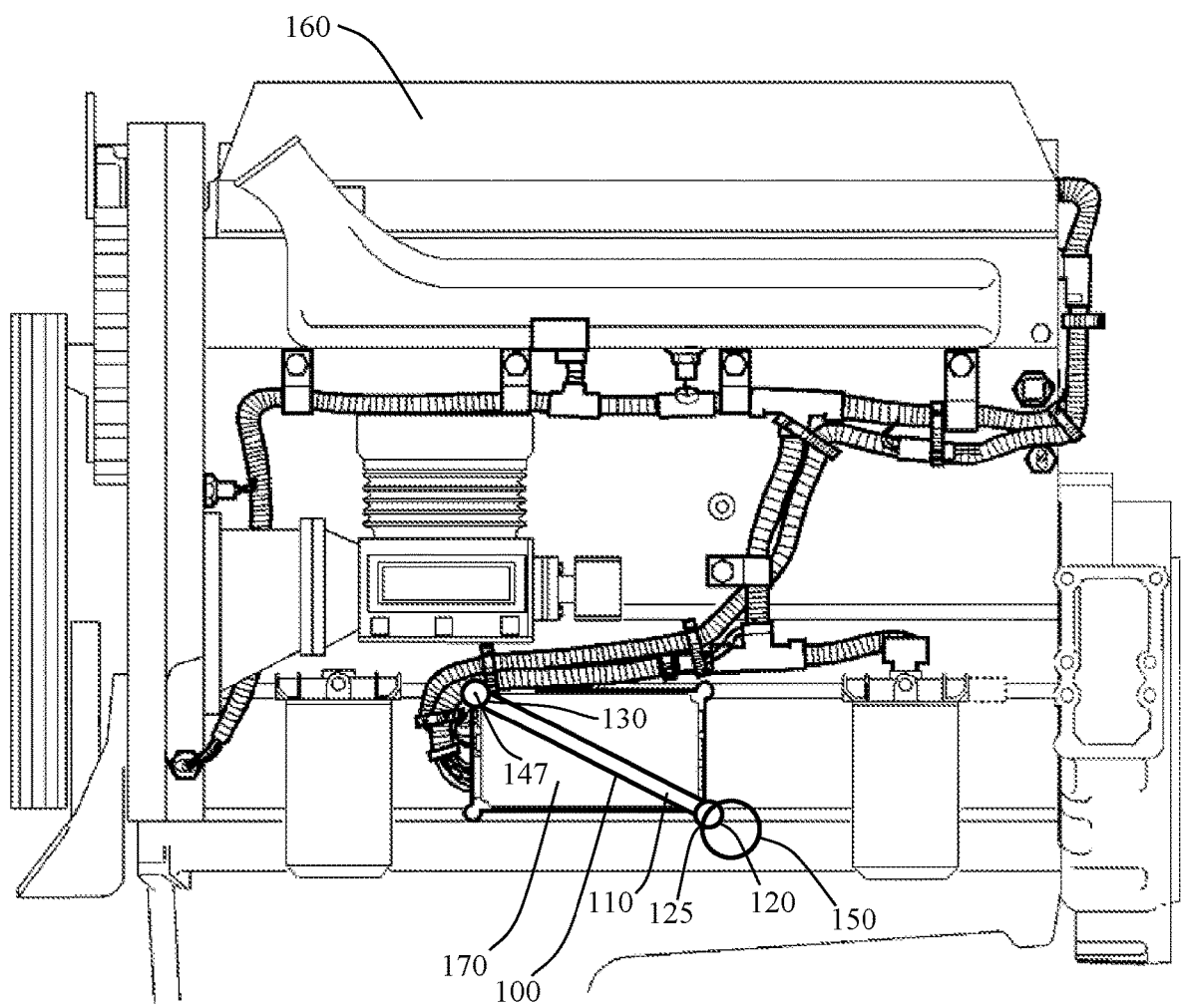
FIG. 6 is a bottom view of an apparatus of FIG. 1 mounted on an engine block and securing an ECM.
Figure 7:
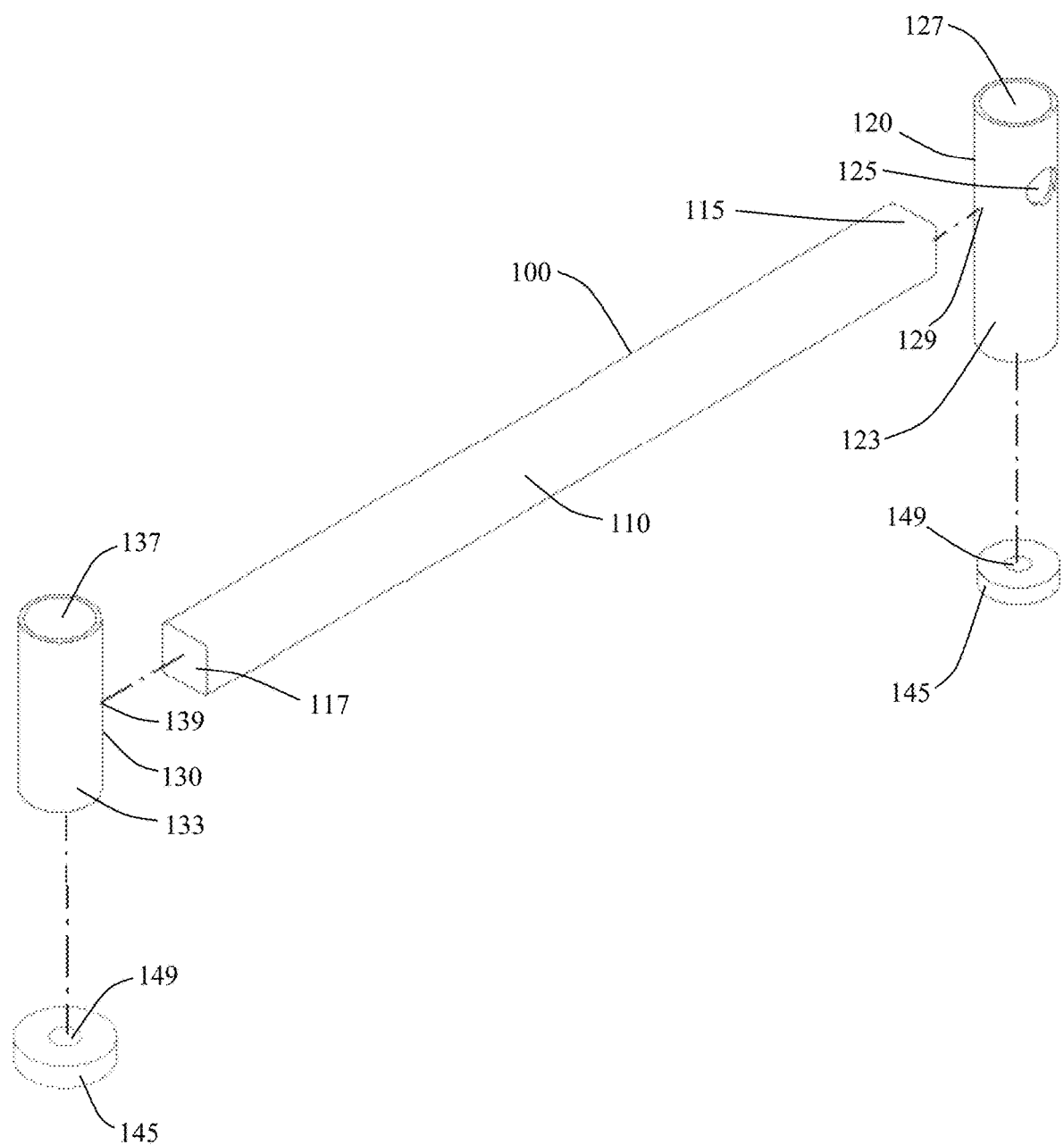
FIG. 7 is an exploded view of an apparatus of FIG. 1.
Figure 8:
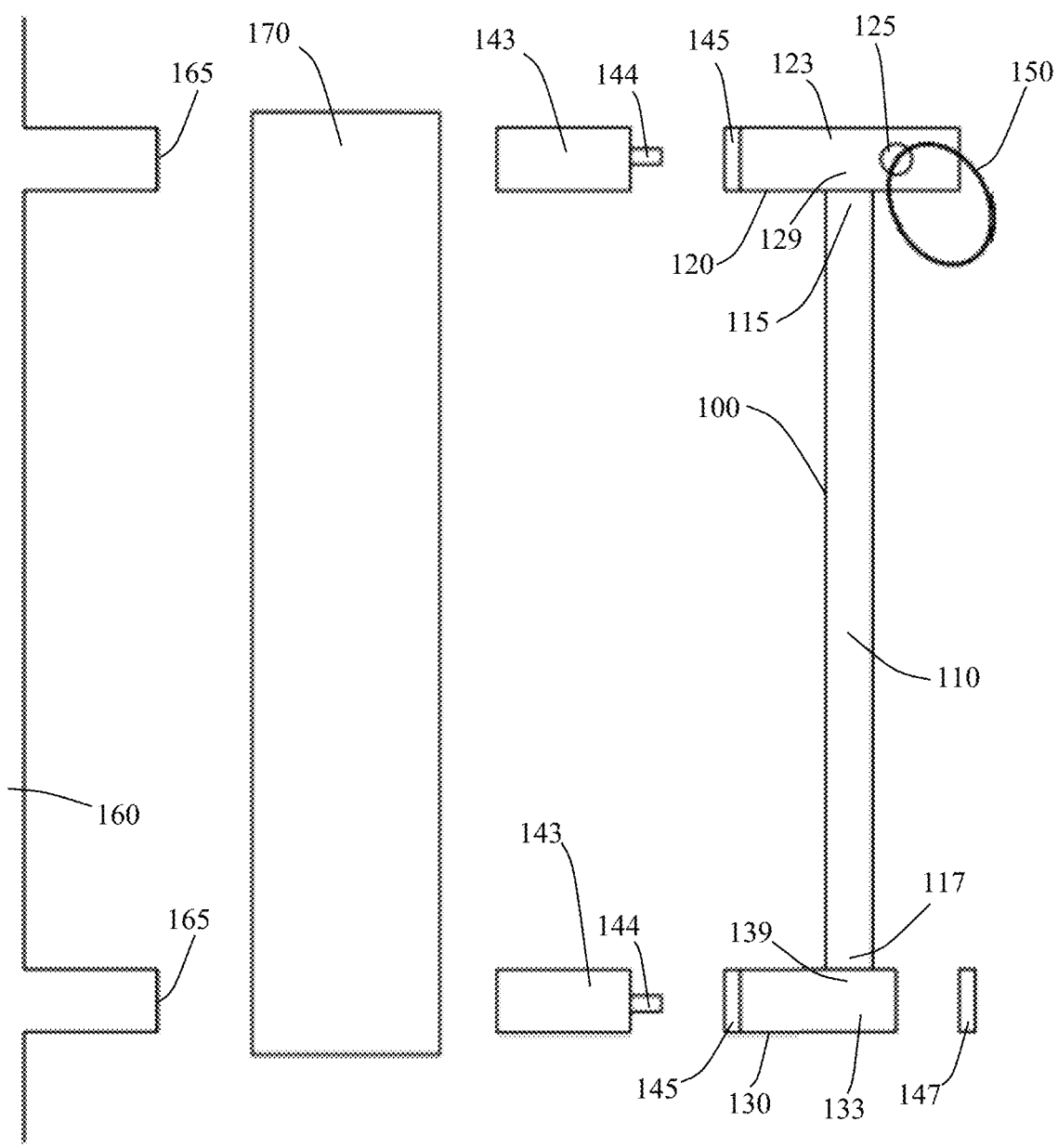
FIG. 8 is a diagram, which illustrates how an apparatus of FIG. 1 is mounted onto an engine block to secure an ECM.

Referring now to the most preferred embodiment of the invention, in FIG. 1, FIG. 2, FIG. 3, FIG. 4, FIG. 5, FIG. 6, FIG. 7 and FIG. 8, a Cross Bar ECM Protection Bracket 100 is shown. FIG. 1 illustrates a front perspective view of a Cross Bar ECM Protection Bracket 100. FIG. 2 depicts a top view of a Cross Bar ECM Protection Bracket 100. FIG. 3 shows a left side view of a Cross Bar ECM Protection Bracket 100. FIG. 4 displays a front view of a Cross Bar ECM Protection Bracket 100. FIG. 5 shows a rear view of a Cross Bar ECM Protection Bracket 100. FIG. 6 depicts a bottom view of a Cross Bar ECM Protection Bracket 100 mounted on an engine block 160 and securing an ECM 170. FIG. 7 illustrates an exploded view of a Cross Bar ECM Protection Bracket 100. FIG. 8 demonstrates a diagram, which illustrates how a Cross Bar ECM Protection Bracket 100 is mounted onto an engine block 160 to secure an ECM 170.

Referring still to the most preferred embodiment of the invention, in FIG. 1, FIG. 2, FIG. 3, FIG. 4, FIG. 5, FIG. 6, FIG. 7 and FIG. 8, the Cross Bar ECM Protection Bracket 100 comprises a diagonal cross beam 110; a first mounting cylinder 130 and a second mounting cylinder 120, which are mounted at opposite ends of the diagonal cross beam 110; and two studded mounting bolts 143, which comprise an extended stud portion 144 and which are each enclosable within the first mounting cylinder 130 or the second mounting cylinder 120 and securable using nuts 147, which attach to the extended stud portions 144. The first mounting cylinder 130 comprises a short hollow cylinder 133 with a first opening 137 at the top of the short hollow cylinder 133 and a mounting ring 145, which comprises a narrow stud opening 149, permanently attached to the bottom of the short hollow cylinder 133. The first mounting cylinder 130 is permanently attached to the first end 117 of the diagonal cross beam 110 at its first connection point 139, which is located substantially near the top of the short hollow cylinder 133. The second mounting cylinder 120 comprises a tall hollow cylinder 123 with a second opening 127 at the top of the tall hollow cylinder 123 and a mounting ring 145, which comprises a narrow stud opening 149, permanently attached to the bottom of the tall hollow cylinder 123. The tall hollow cylinder 123 further comprises a lock opening 125 near the top of the tall hollow cylinder 123. The second mounting cylinder 120 is permanently attached to the second end 115 of the diagonal cross beam 110 at its second connection point 129, which is located below the lock opening 125. The diagonal cross beam 110 comprises a length that substantially spans the diagonal length of an ECM 170, such that the first mounting cylinder 130 and a second mounting cylinder 120 align, respectively, with diagonally opposite mounting bolt holes 165 in the engine block 160, which are normally used to mount an ECM 170 by itself. Further, the first mounting cylinder 130 and the second mounting cylinder 120 comprise depths sufficient to span the depth of an ECM 170.

In further detail, referring still to FIG. 1, FIG. 2, FIG. 3, FIG. 4, FIG. 5, FIG. 6, FIG. 7 and FIG. 8, in order to secure an ECM 170 and discourage or prevent theft, a Cross Bar ECM Protection Bracket 100 is installed by first removing two diagonally opposite original mounting bolts for the ECM 170 from the mounting bolt holes 165 in the engine block 160. Next, the two original mounting bolts, which were removed, are replaced with studded mounting bolts 143. Next, the extended stud portions 144 of the studded mounting bolts 143 are extended through the narrow stud openings 149 of the mounting rings 145 in the first mounting cylinder 130 and the second mounting cylinder 120, so that the first mounting cylinder 130 and the second mounting cylinder 120 align with the studded mounting bolts 143 mounted in mounting bolt holes 165 in the engine block 160, and so that the diagonal cross beam 110 spans the diagonal length of the ECM 170. Next, the nuts 147 are fitted over the extended stud portion 144 of the studded mounting bolts 143 within the first opening 137 of the first mounting cylinder 130 and within the second opening 127 of the second mounting cylinder 120, and the nuts 147 are tightened until the Cross Bar ECM Protection Bracket 100 is firmly affixed to the engine block 160 and the diagonal cross beam 110 securely spans the diagonal length of the ECM 170. Lastly, a padlock 150 is fitted through the lock opening 125 in the second mounting cylinder 120 and locked, thereby preventing access to the nut 147 safeguarded within the second opening 127 of the second mounting cylinder 120. Once the padlock 150 is locked the ECM 170 is secured against theft.

The construction details of the invention as shown in FIG. 1, FIG. 2, FIG. 3, FIG. 4, FIG. 5, FIG. 6, FIG. 7 and FIG. 8, are as follows. The diagonal cross beam 110 comprises metal, steel, aluminum, metal alloy, plastic, fiberglass, ceramic, composite material, or the like, and is permanently affixed to the first mounting cylinder 130 and the second mounting cylinder 120, such as by welding, or the like. The first mounting cylinder 130 comprises metal, steel, aluminum, metal alloy, plastic, fiberglass, ceramic, composite material, or the like. The second mounting cylinder 120 comprises metal, steel, aluminum, metal alloy, plastic, fiberglass, ceramic, composite material, or the like. The studded mounting bolts 143 comprise metal, steel, aluminum, metal alloy, plastic, fiberglass, ceramic, composite material, or the like. The nuts 147 comprise metal, steel, aluminum, metal alloy, plastic, fiberglass, ceramic, composite material, or the like. The mounting rings 145 comprise metal, steel, aluminum, metal alloy, plastic, fiberglass, ceramic, composite material, or the like, and are permanently affixed to the first mounting cylinder 130 and the second mounting cylinder 120, such as by welding, or the like. The padlock 150 comprises a standard pad lock, combination lock, or the like. The materials listed herein are examples only and not intended to limit the scope of the present invention.

Figure 9:
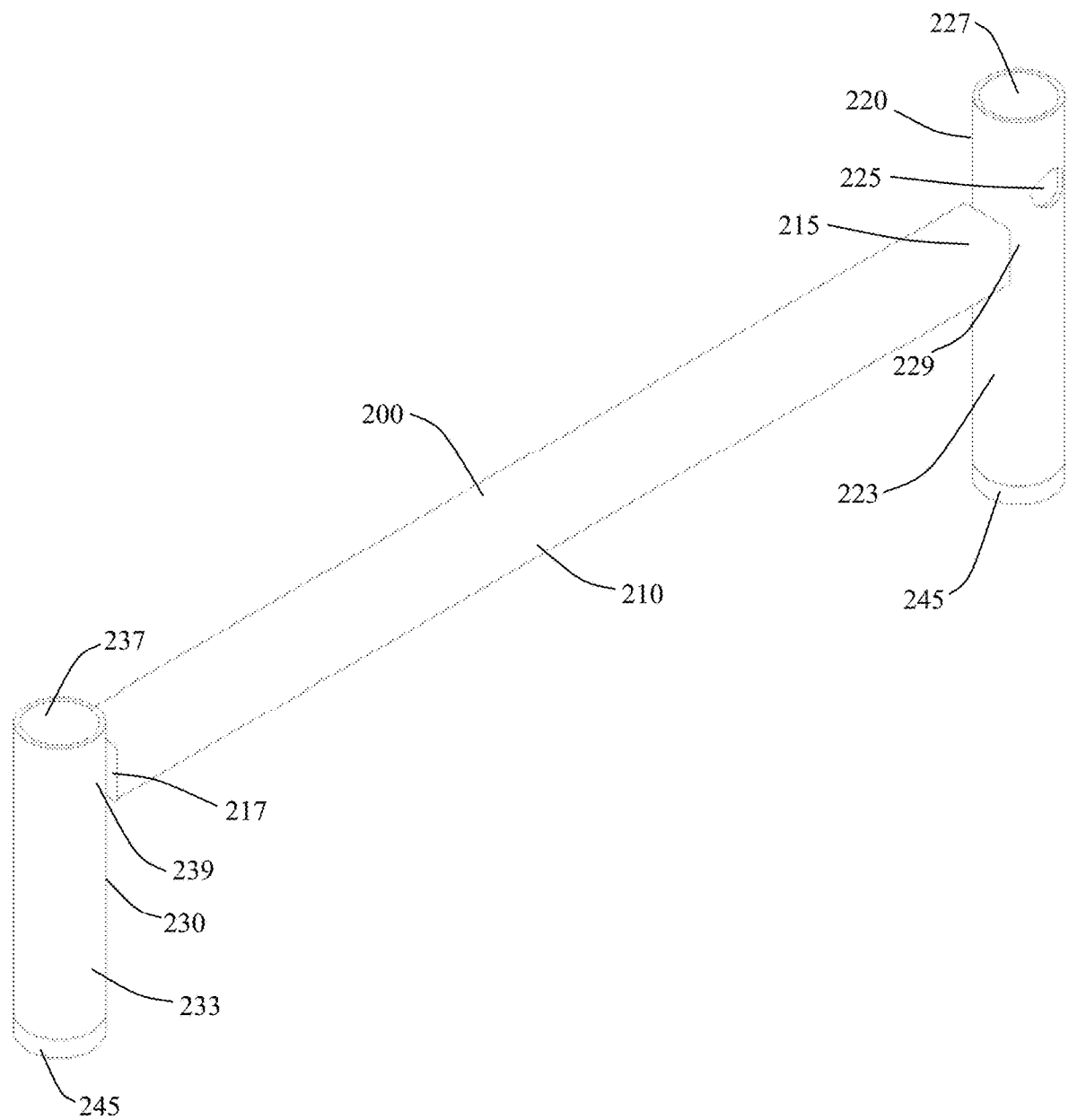
FIG. 9 is a front perspective view of another preferred embodiment of an apparatus of the present invention.
Figure 10:
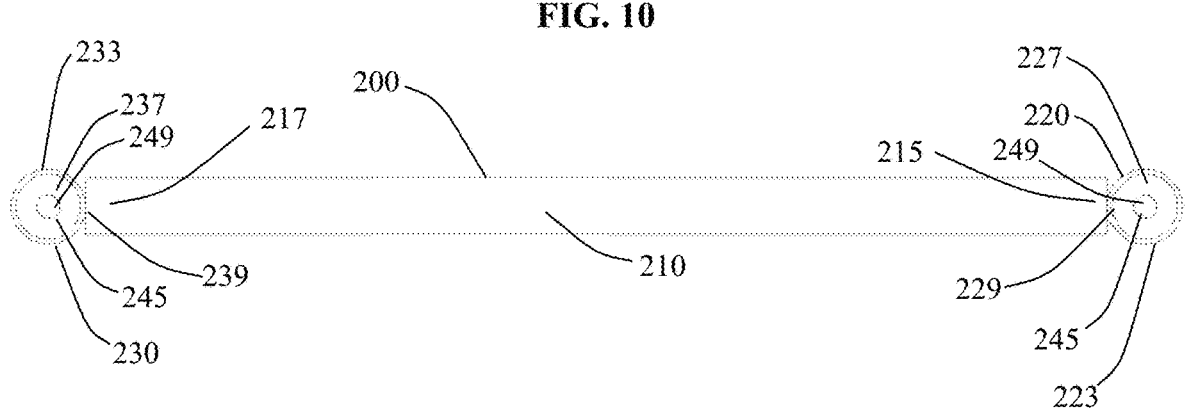
FIG. 10 is a top view of an apparatus of FIG. 9.
Figure 11:
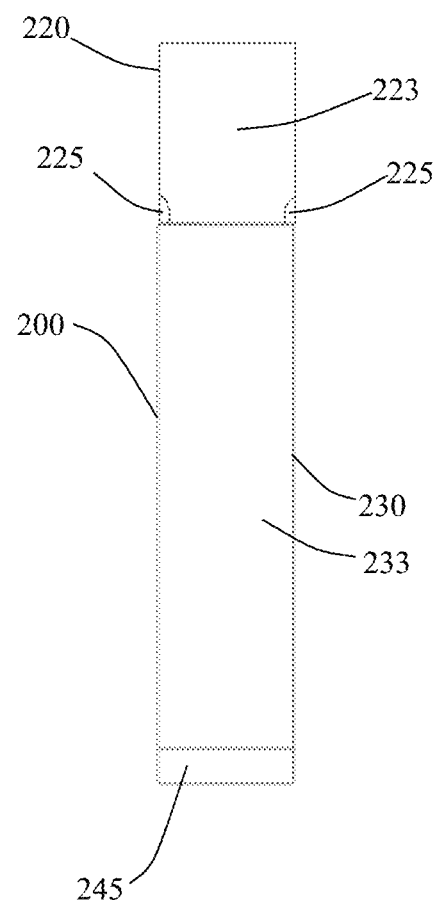
FIG. 11 is a left side view of an apparatus of FIG. 9.
Figure 12:
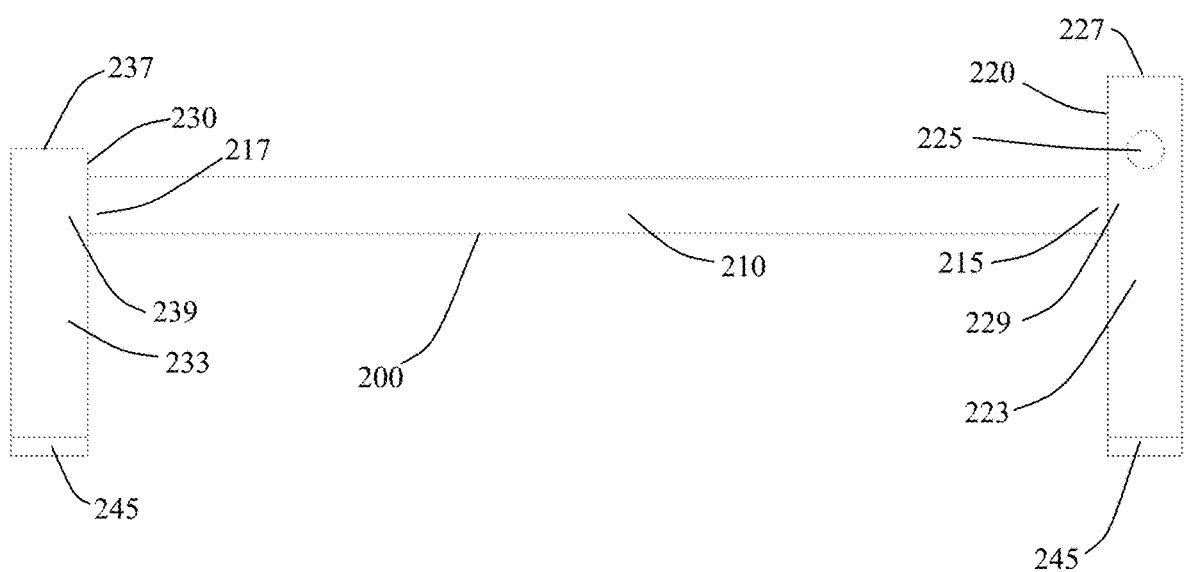
FIG. 12 is a front view of an apparatus of FIG. 9.
Figure 13:
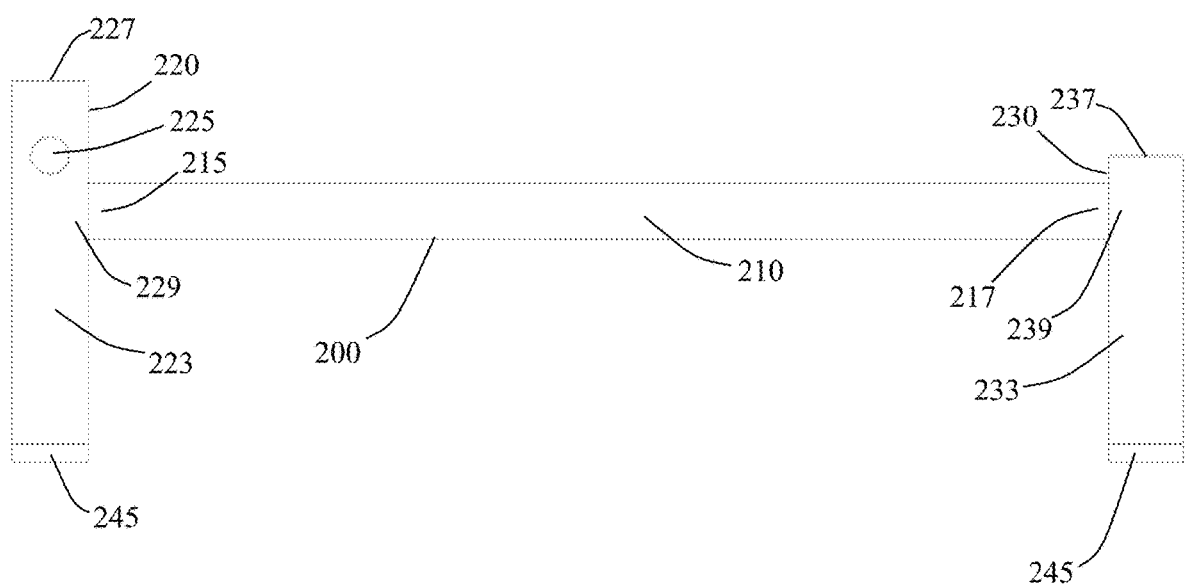
FIG. 13 is a rear view of an apparatus of FIG. 9.
Figure 14:
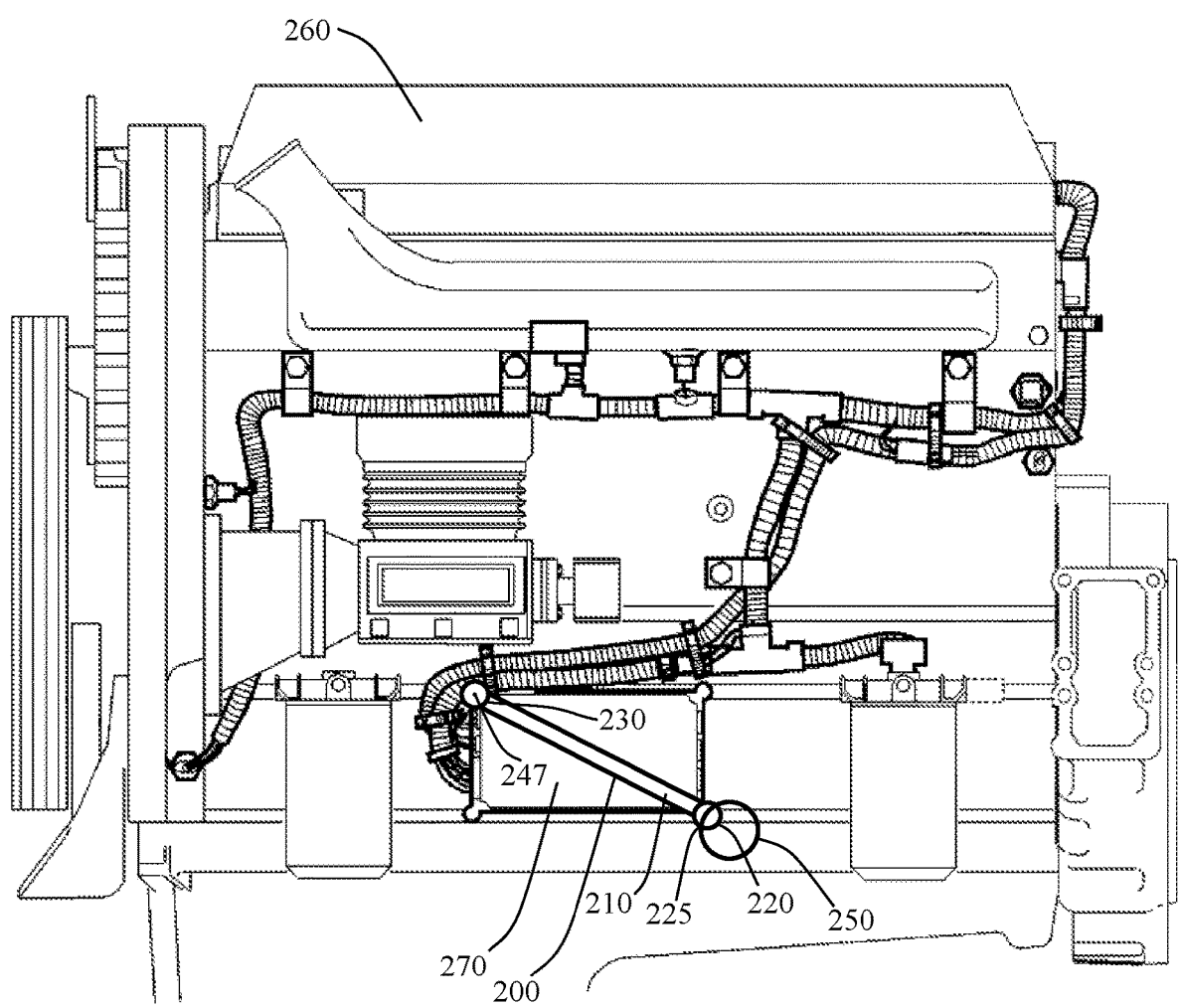
FIG. 14 is a bottom view of an apparatus of FIG. 9 mounted on an engine block and securing an ECM.
Figure 15:
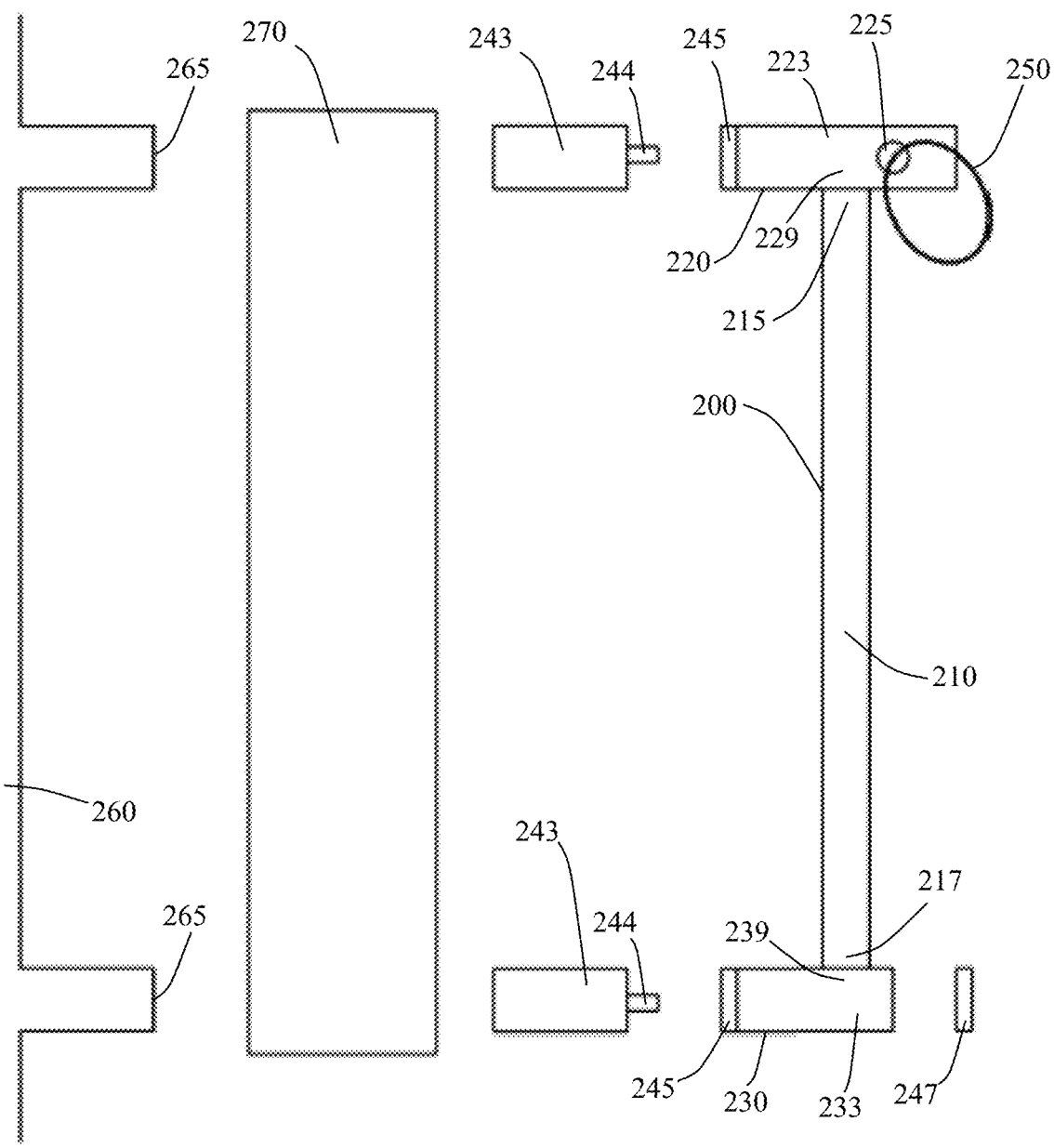
FIG. 15 is a diagram, which illustrates how an apparatus of FIG. 9 is mounted onto an engine block to secure an ECM.

Referring now to another preferred embodiment of the present invention, in FIG. 9, FIG. 10, FIG. 11, FIG. 12, FIG. 13 and FIG. 14, a Large Cross Bar ECM Protection Bracket 200 is shown in order to demonstrate variations of the present inventions, which allow it to fit ECM's on different types of engines. FIG. 9 illustrates a front perspective view of a Large Cross Bar ECM Protection Bracket 200. FIG. 10 depicts a top view of a Large Cross Bar ECM Protection Bracket 200. FIG. 11 shows a left side view of a Large Cross Bar ECM Protection Bracket 200. FIG. 12 displays a front view of a Large Cross Bar ECM Protection Bracket 200. FIG. 13 shows a rear view of a Large Cross Bar ECM Protection Bracket 200. FIG. 14 depicts a bottom view of a Large Cross Bar ECM Protection Bracket 200 mounted on a large engine block 260 and securing a large ECM 270. FIG. 15 demonstrates a diagram, which illustrates how a Large Cross Bar ECM Protection Bracket 200 is mounted onto a large engine block 260 to secure a large ECM 270.

Referring still to the preferred embodiment of the invention in FIG. 9, FIG. 10, FIG. 11, FIG. 12, FIG. 13, FIG. 14 and FIG. 15, the Large Cross Bar ECM Protection Bracket 200 comprises a large diagonal cross beam 210; a first large mounting cylinder 230 and a second large mounting cylinder 220, which are mounted at opposite ends of the large diagonal cross beam 210; and two large studded mounting bolts 243, which comprise a large extended stud portion 244 and which are each enclosable within the first large mounting cylinder 230 or the second large mounting cylinder 220 and securable using large nuts 247, which attach to the large extended stud portions 244. The first large mounting cylinder 230 comprises a large short hollow cylinder 233 with a first large opening 237 at the top of the large short hollow cylinder 233 and a large mounting ring 245, which comprises a large narrow stud opening 249, permanently attached to the bottom of the large short hollow cylinder 233. The first large mounting cylinder 230 is permanently attached to the large first end 217 of the large diagonal cross beam 210 at its large first connection point 239, which is located substantially near the top of the large short hollow cylinder 233. The second large mounting cylinder 220 comprises a large tall hollow cylinder 223 with a large second opening 227 at the top of the large tall hollow cylinder 223 and a large mounting ring 245, which comprises a large narrow stud opening 249, permanently attached to the bottom of the large tall hollow cylinder 223. The large tall hollow cylinder 223 further comprises a large lock opening 225 near the top of the large tall hollow cylinder 223. The second large mounting cylinder 220 is permanently attached to the large second end 215 of the large diagonal cross beam 210 at its large second connection point 229, which is located below the large lock opening 225. The large diagonal cross beam 210 comprises a length that substantially spans the diagonal length of a large ECM 270, such that the first large mounting cylinder 230 and a second large mounting cylinder 220 align, respectively, with diagonally opposite large mounting bolt holes 265 in the large engine block 260, which are normally used to mount a large ECM 270 by itself. Further, the first large mounting cylinder 230 and the second large mounting cylinder 220 comprise depths sufficient to span the depth of a large ECM 270.

In further detail, referring still to FIG. 9, FIG. 10, FIG. 11, FIG. 12, FIG. 13, FIG. 14 and FIG. 15, in order to secure a large ECM 270 and discourage or prevent theft, a Large Cross Bar ECM Protection Bracket 200 is installed by first removing two diagonally opposite original large mounting bolts for the large ECM 270 from the large mounting bolt holes 265 in the large engine block 260. Next, the two original mounting bolts, which were removed, are replaced with large studded mounting bolts 243. Next, the large extended stud portions 244 of the studded mounting bolts 143 are extended through the large narrow stud openings 249 of the large mounting rings 245 in the first large mounting cylinder 230 and the second large mounting cylinder 220, so that the first large mounting cylinder 230 and the second large mounting cylinder 220 align with the large studded mounting bolts 243 mounted in large mounting bolt holes 265 in the large engine block 260, and so that the large diagonal cross beam 210 spans the diagonal length of the large ECM 270. Next, the large nuts 247 are fitted over the large extended stud portion 244 of the large studded mounting bolts 243 within the large first opening 237 of the first large mounting cylinder 230 and within the large second opening 227 of the second large mounting cylinder 220, and the large nuts 247 are tightened until the Large Cross Bar ECM Protection Bracket 200 is firmly affixed to the large engine block 260 and the large diagonal cross beam 210 securely spans the diagonal length of the large ECM 270. Lastly, a large padlock 250 is fitted through the large lock opening 225 in the second large mounting cylinder 220 and locked, thereby preventing access to the large nut 247 safeguarded within the large second opening 227 of the second large mounting cylinder 220. Once the large padlock 250 is locked the large ECM 270 is secured against theft.

The construction details of the invention as shown in FIG. 9, FIG. 10, FIG. 11, FIG. 12, FIG. 13, FIG. 14 and FIG. 15, are as follows. The large diagonal cross beam 210 comprises metal, steel, aluminum, metal alloy, plastic, fiberglass, ceramic, composite material, or the like, and is permanently affixed to the first large mounting cylinder 230 and the second large mounting cylinder 220, such as by welding, or the like. The first large mounting cylinder 230 comprises metal, steel, aluminum, metal alloy, plastic, fiberglass, ceramic, composite material, or the like. The second large mounting cylinder 220 comprises metal, steel, aluminum, metal alloy, plastic, fiberglass, ceramic, composite material, or the like. The large studded mounting bolts 243 comprise metal, steel, aluminum, metal alloy, plastic, fiberglass, ceramic, composite material, or the like. The large nuts 247 comprise metal, steel, aluminum, metal alloy, plastic, fiberglass, ceramic, composite material, or the like. The large mounting rings 245 comprise metal, steel, aluminum, metal alloy, plastic, fiberglass, ceramic, composite material, or the like, and are permanently affixed to the first mounting cylinder 130 and the second mounting cylinder 120, such as by welding, or the like. The large padlock 250 comprises a standard pad lock, combination lock, or the like. The materials listed herein are examples only and not intended to limit the scope of the present invention.

Figure 16:
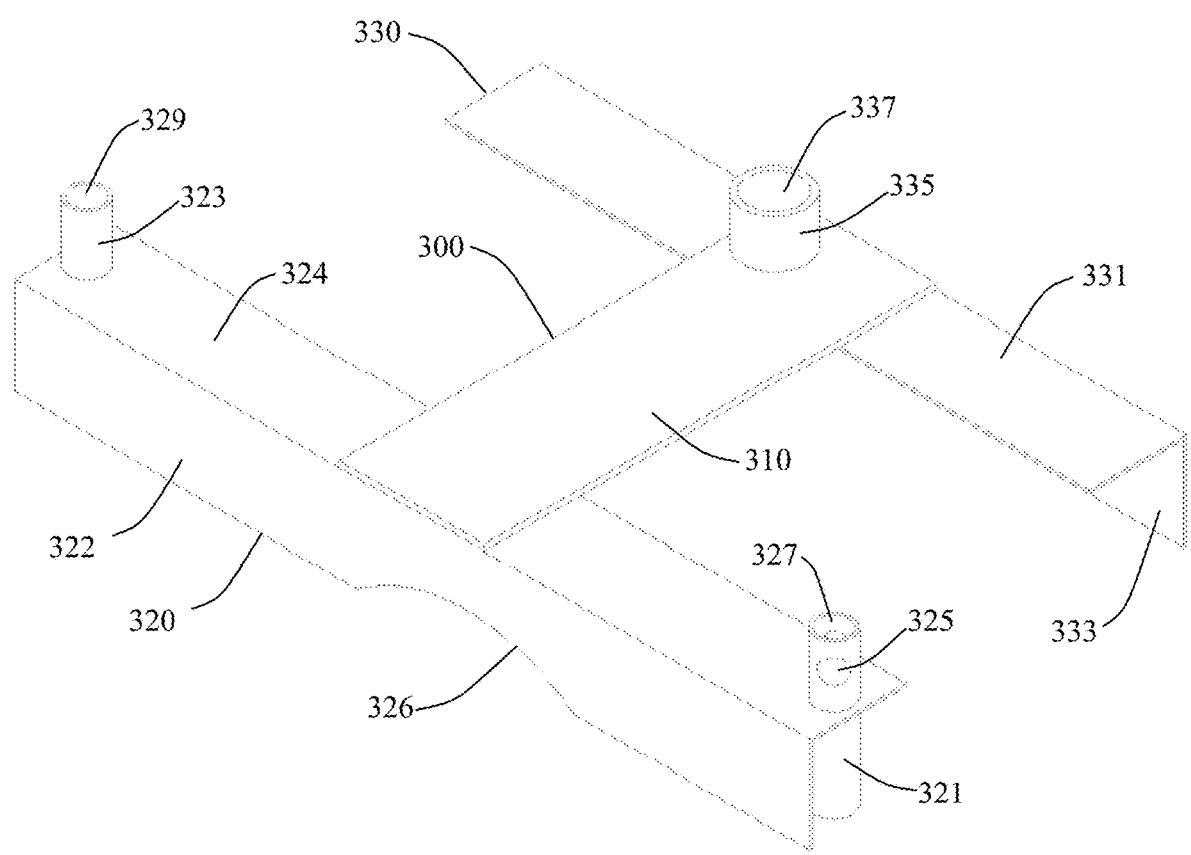
FIG. 16 is a front perspective view of another preferred embodiment of an apparatus of the present invention.
Figure 17:
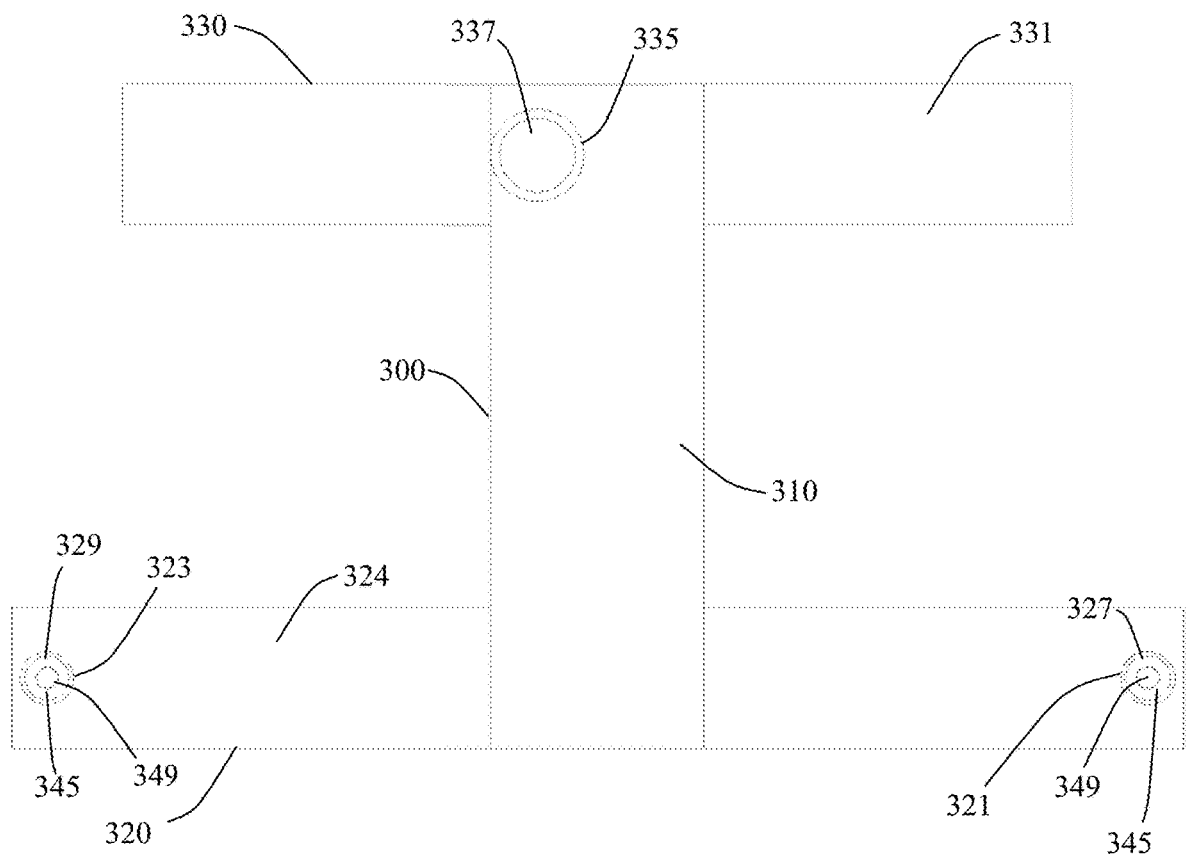
FIG. 17 is a top view of an apparatus of FIG. 16.
Figure 18:
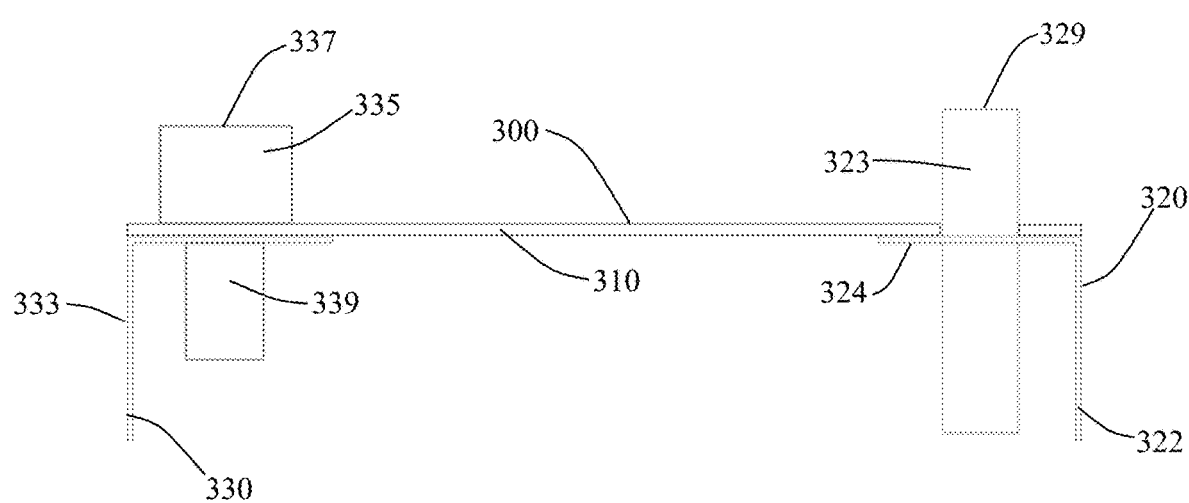
FIG. 18 is a left side view of an apparatus of FIG. 16.
Figure 19:
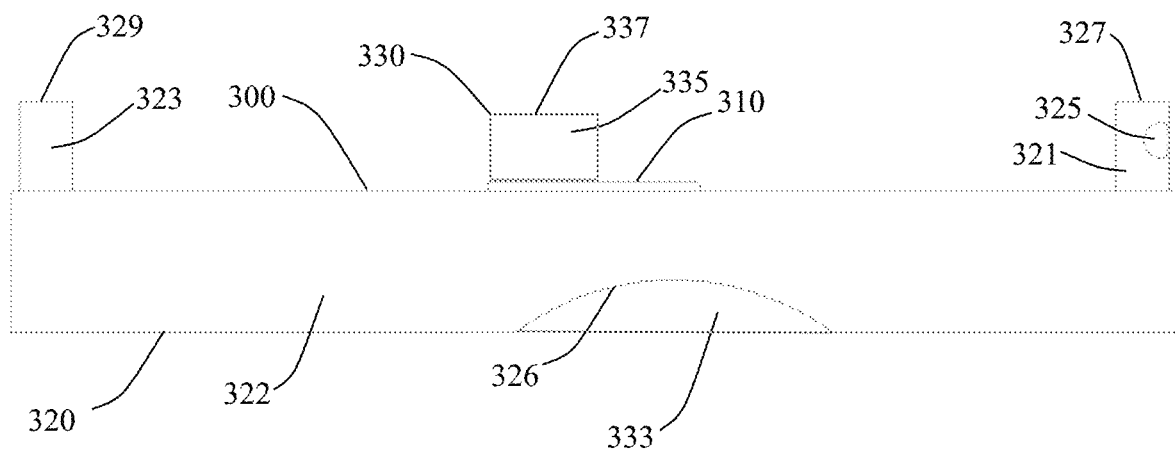
FIG. 19 is a front view of an apparatus of FIG. 16.
Figure 20:
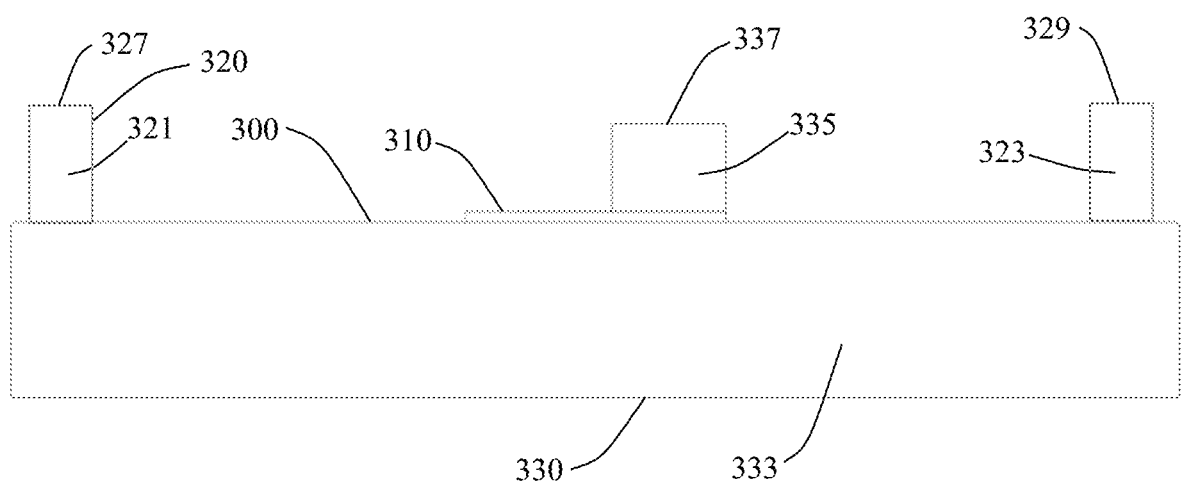
FIG. 20 is a rear view of an apparatus of FIG. 16.
Figure 21:
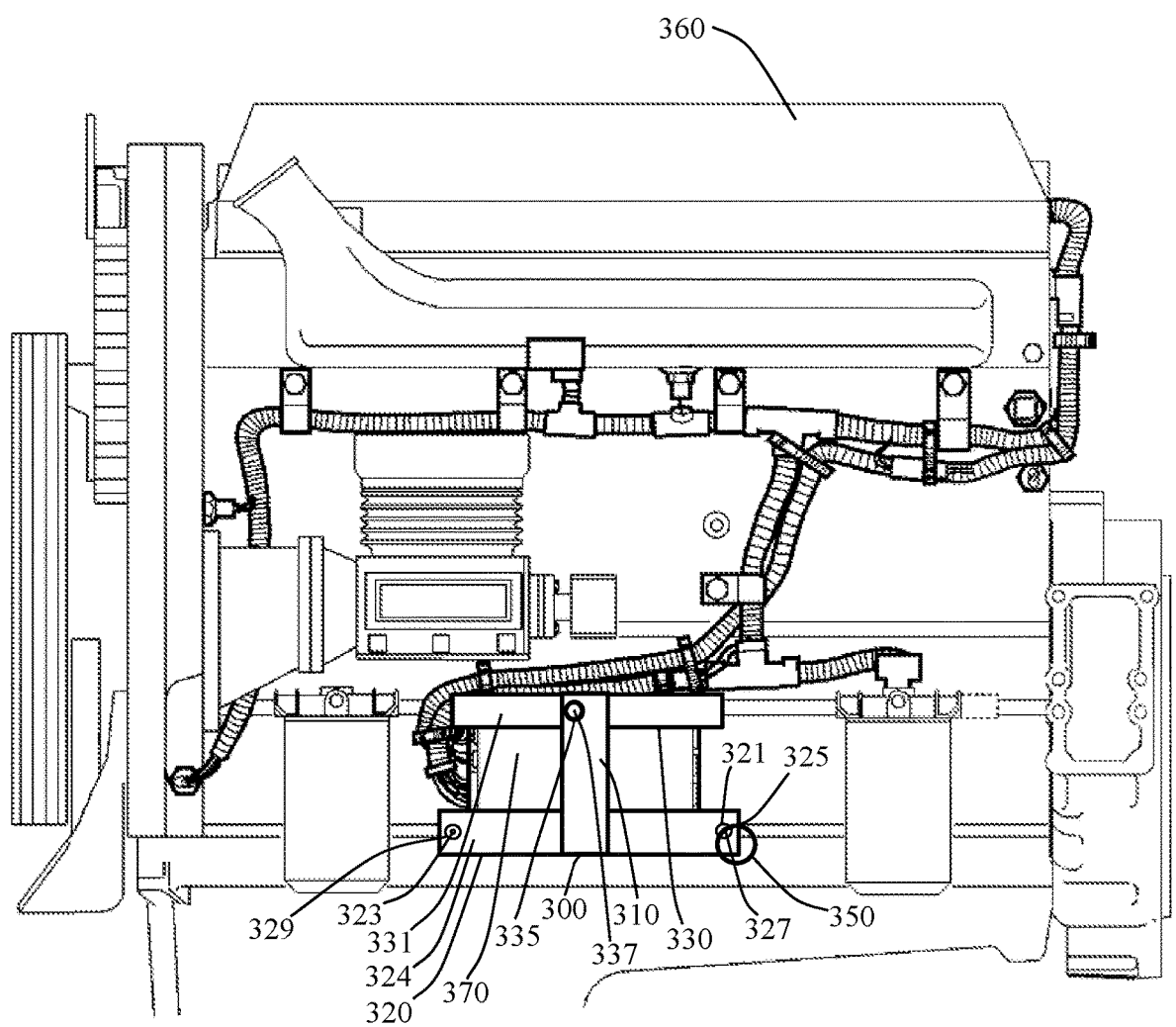
FIG. 21 is a bottom view of an apparatus of FIG. 16 mounted on an engine block and securing an ECM.
Figure 22:
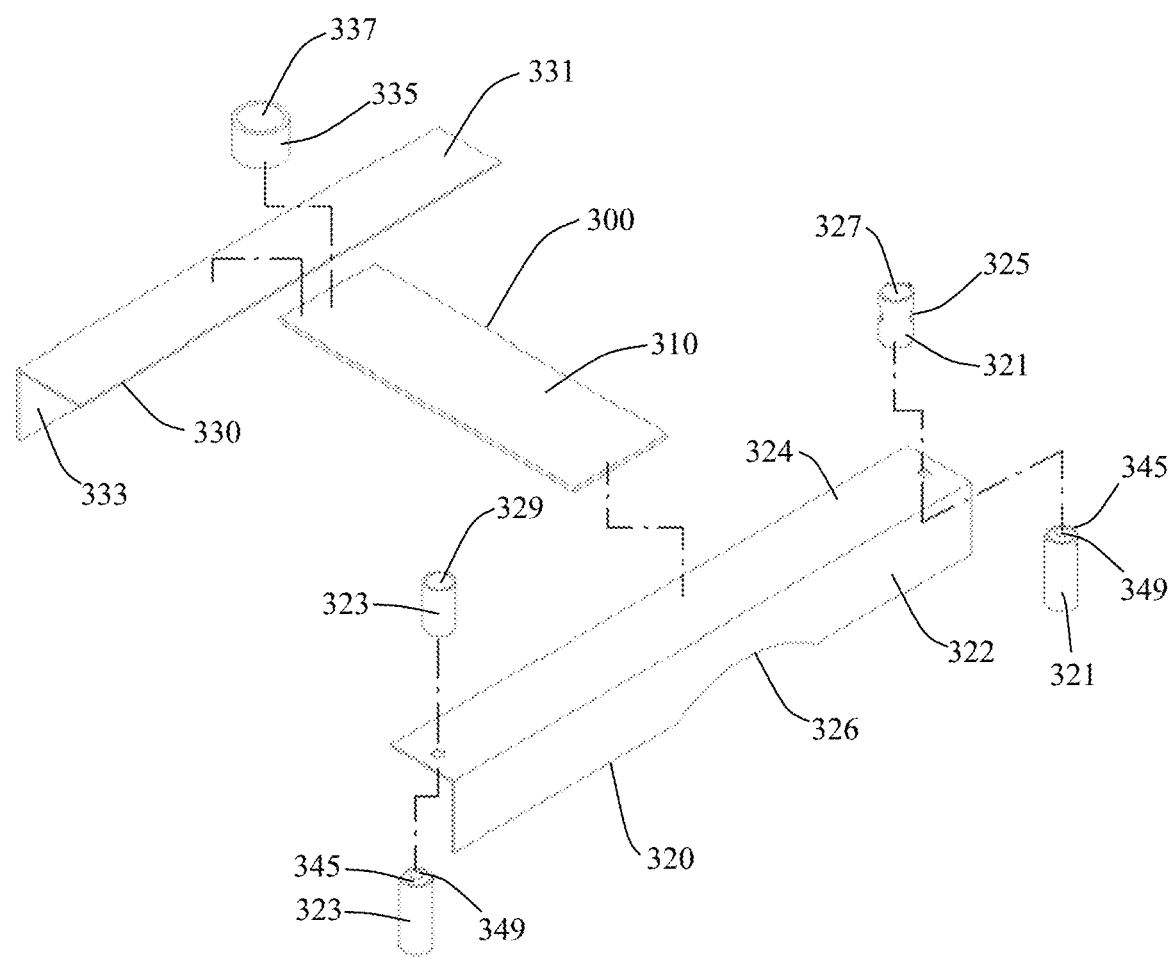
FIG. 22 is an exploded view of an apparatus of FIG. 16.
Figure 23:
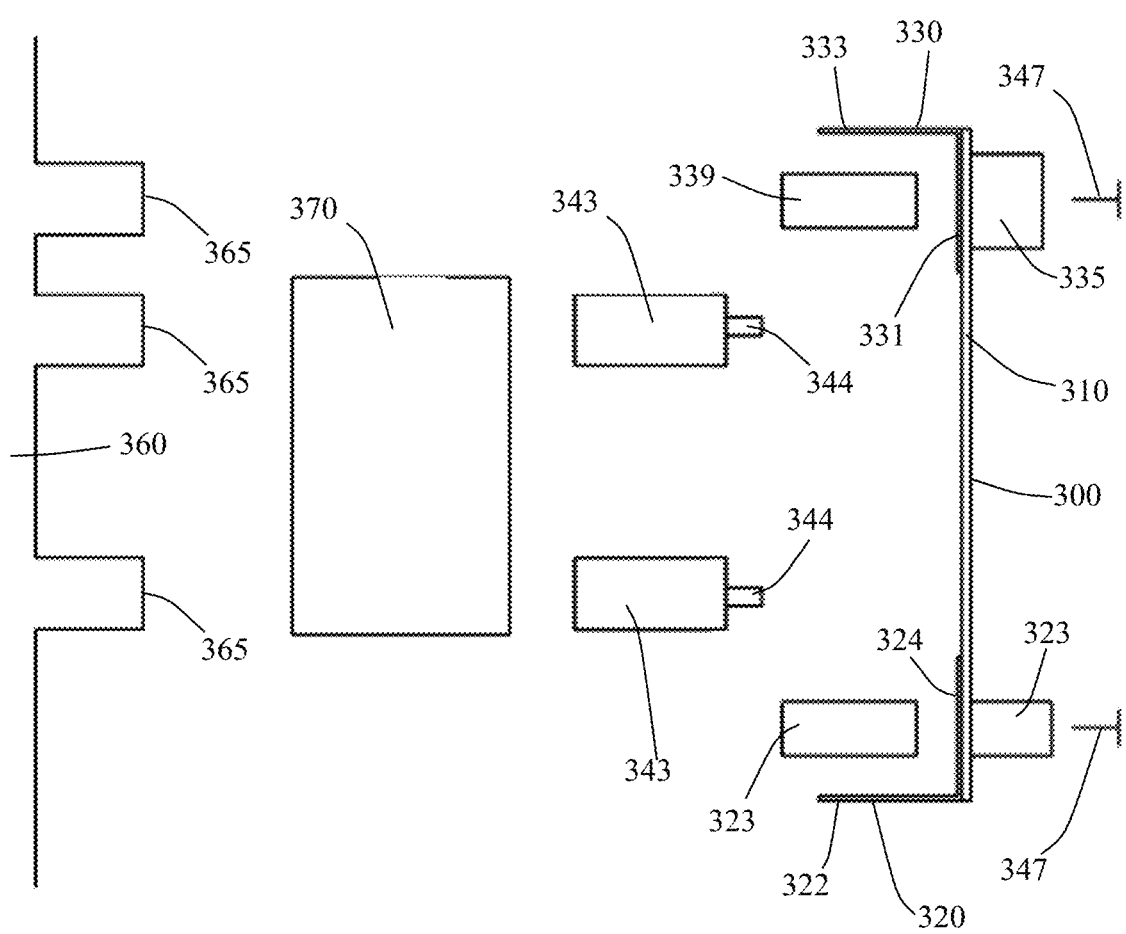
FIG. 23 is a diagram, which illustrates how an apparatus of FIG. 16 is mounted onto an engine block to secure an ECM.

Referring now to another preferred embodiment of the present invention, in FIG. 16, FIG. 17, FIG. 18, FIG. 19, FIG. 20, FIG. 21, FIG. 22 and FIG. 23, a L-Beam ECM Protection Bracket 300 is shown. FIG. 16 illustrates a front perspective view of a L-Beam ECM Protection Bracket 300. FIG. 17 depicts a top view of a L-Beam ECM Protection Bracket 300. FIG. 18 shows a left side view of a L-Beam ECM Protection Bracket 300. FIG. 19 displays a front view of a L-Beam ECM Protection Bracket 300. FIG. 20 shows a rear view of a L-Beam ECM Protection Bracket 300. FIG. 21 depicts a bottom view of a L-Beam ECM Protection Bracket 300 mounted on a L-beam engine block 360 and securing a L-beam ECM 370. FIG. 22 illustrates an exploded view of a L-Beam ECM Protection Bracket 300. FIG. 23 demonstrates a diagram, which illustrates how a L-Beam ECM Protection Bracket 300 is mounted onto a L-beam engine block 360 to secure a L-beam ECM 370.

Referring still to the preferred embodiment of the invention in FIG. 16, FIG. 17, FIG. 18, FIG. 19, FIG. 20, FIG. 21, FIG. 22 and FIG. 23, the L-Beam ECM Protection Bracket 300 comprises two inwardly-facing parallel L-beams, a first L-beam 330 and a second L-beam 320, joined by a flat cross beam 310 welded to middle of the two parallel L-beams; and three L-beam studded mounting bolts 343, which comprise a L-beam extended stud portion 344 and which are securable using L-beam mount bolts 347, which attach to the L-beam extended stud portions 344. The first L-beam 330 comprises a first top 331; a first side 333; and an off-center cylinder 339, which extends from interior of the "L" of the first L-beam 330 on the other side of where the flat cross beam 310 attaches to the first L-beam 330. The second L-beam 320 comprises a second top 324; a second side 322; and two outer cylinders, a first outer cylinder 321 and a second outer cylinder 323, which both extend through the second top 324 of the second L-beam 320 at the ends of the second L-beam 320. The second L-beam 320 further comprises a cutout 326 in the middle of the second L-beam 320 for accommodating the topography of chassis frame for the L-beam engine block 360 to which the L-beam ECM Protection Bracket 370 attaches. The first outer cylinder 321 comprises a lock hole 325, which may receive a L-beam padlock 350; a first outer opening 327; and a L-beam mounting ring 345, which comprises a L-beam narrow stud opening 349, fixed in the middle of the first outer cylinder 321. The second outer cylinder 323 comprises a second outer opening 329 and a L-beam mounting ring 345, which comprises a L-beam narrow stud opening 349, fixed in the middle of the second outer cylinder 323. The flat crossbeam 310 comprises a larger cylinder 335, which extends from the flat cross beam 310 on the other side of the first L-beam 330 from where the off-center cylinder 339 is mounted and further comprises a smaller diameter hole 337 concentric within the larger cylinder 335. The flat cross beam 310 comprises a length that substantially spans the width of a L-beam ECM 370, such that the off-center cylinder 339 and larger cylinder 335 align with a L-beam mounting bolt hole 365 in the L-beam engine block 360 adjacent to the middle of the L-beam ECM 370. The first L-beam 330 comprises a length that substantially spans the length of a L-beam ECM 370. The second L-beam 320 comprises a length that extends beyond the length of a L-beam ECM 370, such that the first outer cylinder 321 and the second outer cylinder 323 line up with L-beam mounting bolt holes 365 in the L-beam engine block 360 on either side of the L-beam ECM 370.

In further detail, referring still to FIG. 16, FIG. 17, FIG. 18, FIG. 19, FIG. 20, FIG. 21, FIG. 22 and FIG. 23, in order to secure a L-beam ECM 370 and discourage or prevent theft, a L-Beam ECM Protection Bracket 300 is installed by first removing three original mounting bolts for the L-beam ECM 370 from the L-beam mounting bolt holes 365 in the L-beam engine block 360. Next, the three original mounting bolts, which were removed, are replaced with L-beam studded mounting bolts 343. Next, the L-beam extended stud portions 344 of the studded mounting bolts 343 are extended through the L-beam narrow stud openings 349 of the L-beam mounting rings 345 in the first outer cylinder 321 and the second outer cylinder 323 and through the off-center cylinder 339 and larger cylinder 335, so that the first outer cylinder 321, the second outer cylinder 323 and the off-center cylinder 339 and larger cylinder 335 align with the L-beam studded mounting bolts 343 mounted in L-beam mounting bolt holes 365 in the L-beam engine block 360. Next, the L-beam mount bolts 347 are affixed to the L-beam studded mounting bolts 343 within the first outer cylinder 321, the second outer cylinder 323 and the off-center cylinder 339 and larger cylinder 335, and the L-beam mount bolts 347 are tightened until the L-Beam ECM Protection Bracket 300 is firmly affixed to the L-beam engine block 360 and securely contains the L-beam ECM 370. Now, the width of the L-beam ECM 370 is contained within the space between the first side 333 and the second side 322, and the L-beam ECM 370 is secured between the first top 331, the second top 324 and the flat cross beam 310, and the L-beam engine block 360. Lastly, a L-beam padlock 350 is fitted through the lock hole 325 in the first outer cylinder 321 and locked, thereby preventing access to the L-beam mount bolt 347 safeguarded within the first outer opening 327 of the first outer cylinder 321. Once the L-beam padlock 350 is locked the L-beam ECM 370 is secured against theft.

The construction details of the invention as shown in FIG. 16, FIG. 17, FIG. 18, FIG. 19, FIG. 20, FIG. 21, FIG. 22 and FIG. 23, are as follows. The first L-beam 330 comprises metal, steel, aluminum, metal alloy, plastic, fiberglass, ceramic, composite material, or the like, and is permanently affixed to the flat cross beam 310, such as by welding, or the like. The second L-beam 320 comprises metal, steel, aluminum, metal alloy, plastic, fiberglass, ceramic, composite material, or the like, and is permanently affixed to the flat cross beam 310, such as by welding, or the like. The flat cross beam 310 comprises metal, steel, aluminum, metal alloy, plastic, fiberglass, ceramic, composite material, or the like, and is permanently affixed to the first L-beam 330 and the second L-beam 320, such as by welding, or the like. The off-center cylinder 339 comprises metal, steel, aluminum, metal alloy, plastic, fiberglass, ceramic, composite material, or the like, and is permanently affixed to the first top 331 of the first L-beam 330, such as by welding, or the like. The first outer cylinder 321 comprises metal, steel, aluminum, metal alloy, plastic, fiberglass, ceramic, composite material, or the like and is permanently affixed to the second top 324 of the second L-beam 320, such as by welding, or the like. The second outer cylinder 323 comprises metal, steel, aluminum, metal alloy, plastic, fiberglass, ceramic, composite material, or the like and is permanently affixed to the second top 324 of the second L-beam 320, such as by welding, or the like. The larger cylinder comprises metal, steel, aluminum, metal alloy, plastic, fiberglass, ceramic, composite material, or the like and is permanently affixed to the flat cross beam 310, such as by welding, or the like. The L-beam studded mounting bolts 343 comprise metal, steel, aluminum, metal alloy, plastic, fiberglass, ceramic, composite material, or the like. The L-beam mount bolts 347 comprise metal, steel, aluminum, metal alloy, plastic, fiberglass, ceramic, composite material, or the like. L-beam mounting rings 345 comprise metal, steel, aluminum, metal alloy, plastic, fiberglass, ceramic, composite material, or the like, and are permanently affixed within the first outer cylinder 321 and the second outer cylinder 323, such as by welding, or the like. The L-beam padlock 350 comprises a standard pad lock, combination lock, or the like. The materials listed herein are examples only and not intended to limit the scope of the present invention.

The advantages of the present invention include, without limitation, that it provides an efficient and cost-effective means of preventing and/or discouraging the theft an ECM for a diesel engine, which are otherwise easily removable, and therefore easily stolen, from the diesel engine. Additionally, the ECM Protection Bracket invention provides a convenient means of securing an ECM in 12.7 Liter or 14 Liter Series 60 Detroit Diesel Engines against theft.

In broad embodiment, the present invention relates generally to an apparatus, which physically secures an ECM to the chassis frame of a diesel vehicle using a heavy, lockable bracket that prevents the removal of the ECM from the diesel engine it controls.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus for securing an electronic control module to an engine to prevent theft, said engine comprising
   an engine block, said engine block comprising
      a plurality of mounting bolt holes,
   a plurality of original mounting bolts, and
   an electronic control module mounted to said engine using said original mounting bolts and said mounting bolt holes, said electronic control module comprising
      a length dimension, and
      a width dimension;
said apparatus comprising:
   a first L-beam, said first L-beam comprising
      a first top,
      a first side, and
      an off-center cylinder;
   a second L-beam, said second L-beam comprising
      a second top, said second top comprising
         a first end, and
         a second end,
      a second side,
      L-beam mounting rings, each said L-beam mounting ring comprising
         a L-beam narrow stud opening, said L-beam narrow stud opening being centered in said L-beam mounting ring,
      a first outer cylinder, said first outer cylinder extending through said first end of said second top, said first outer cylinder comprising
         a lock hole,
         a first outer opening, and
         said L-beam mounting ring, said L-beam mounting ring being centered within said first outer opening,
      a second outer cylinder, said second outer cylinder extending through said second end of said second top, said second outer cylinder comprising
         a second outer opening and
         said L-beam mounting ring, said L-beam mounting ring being centered within said second outer opening, and
      a cutout in said second side for accommodating the topography of said engine,
   wherein said first L-beam and said second L-beam are inwardly facing and parallel;
   a flat cross beam, said flat cross beam joining said first L-beam and said second L-beam, said flat cross beam comprising
      a larger cylinder, said a larger cylinder lining up with said off-center cylinder of said first L-beam, said larger cylinder comprising
         a smaller diameter hole, said smaller diameter hole being centered within said larger cylinder;
   three studded mounting bolts, said studded mounting bolts comprising
      an extended stud portion;
   three L-beam mount bolts; and
   a padlock;

wherein said flat cross beam comprises a length, which substantially spans said width dimension of said electronic control module, such that said off-center cylinder and said larger cylinder align with said mounting bolt hole of said engine block adjacent to the middle of said electronic control module;

wherein said first L-beam comprises a length, which substantially spans said length dimension of said electronic control module; and wherein said second L-beam comprises a length, which extends beyond said length dimension of said electronic control module, such that said first outer cylinder and said second outer cylinder line up with said mounting bolt holes in said engine block on either side of said electronic control module;

wherein said electronic control module is secured to said engine by removing said original mounting bolts for said electronic control module from said mounting bolt holes in said engine block, replacing said original mounting bolts with said studded mounting bolts, extending said extended stud portions of said studded mounting bolts through said L-beam narrow stud opening of said L-beam mounting ring in said first outer cylinder, through said L-beam narrow stud opening of said L-beam mounting ring in said second outer cylinder, and through said off-center cylinder and larger cylinder, so that said first outer cylinder, said second outer cylinder and said off-center cylinder and said larger cylinder align with said studded mounting bolts mounted in said mounting bolt holes in said engine block, affixing said L-beam mount bolts to said studded mounting bolts within said first outer cylinder, said second outer cylinder, and said off-center cylinder and said larger cylinder, tightening said L-beam mount bolts until said apparatus is firmly affixed to said engine block, so that said width dimension of said electronic control module is contained within the space between said first side and said second side, and said electronic control module is secured between said first top, said second top, said flat cross beam, and said engine block, securely fitting said padlock through said lock hole in said first outer cylinder, and locking said padlock, thereby preventing access to said L-beam mount bolt safeguarded within said first outer opening of said first outer cylinder.

2. An apparatus of claim 1, said engine comprising a diesel engine.

3. An apparatus of claim 1, said engine comprising a 12.7 Liter Series 60 Detroit Diesel Engine.

4. An apparatus of claim 1, said engine comprising a 14 Liter Series 60 Detroit Diesel Engine.

* * * * *